Dec. 19, 1939.   W. L. BENNINGHOFF   2,184,136
APPARATUS FOR CUTTING THREADS
Filed Sept. 6, 1938   6 Sheets-Sheet 1

INVENTOR:
W. L. Benninghoff
BY Ray A. Gehr
ATTORNEY

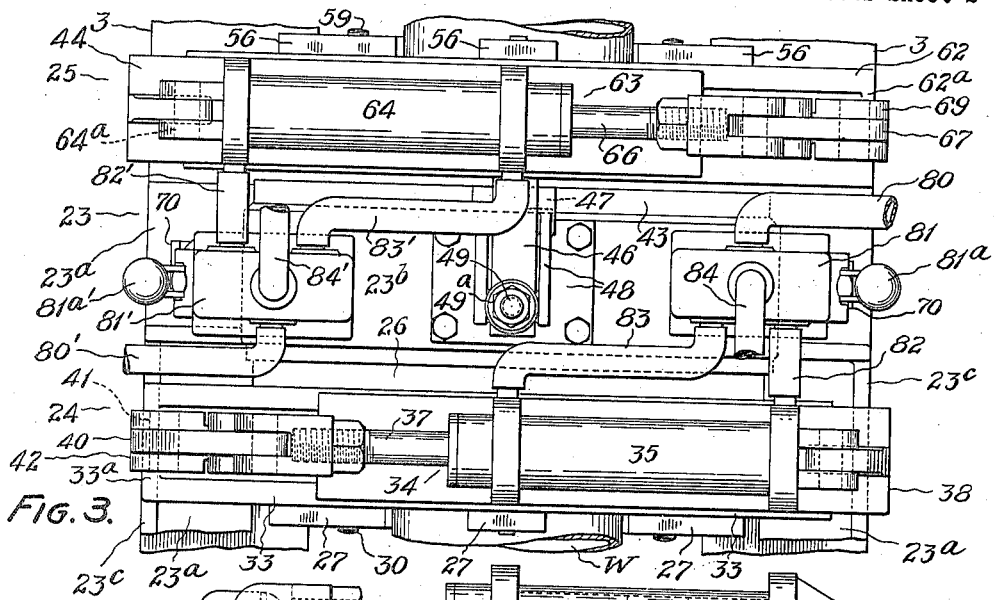

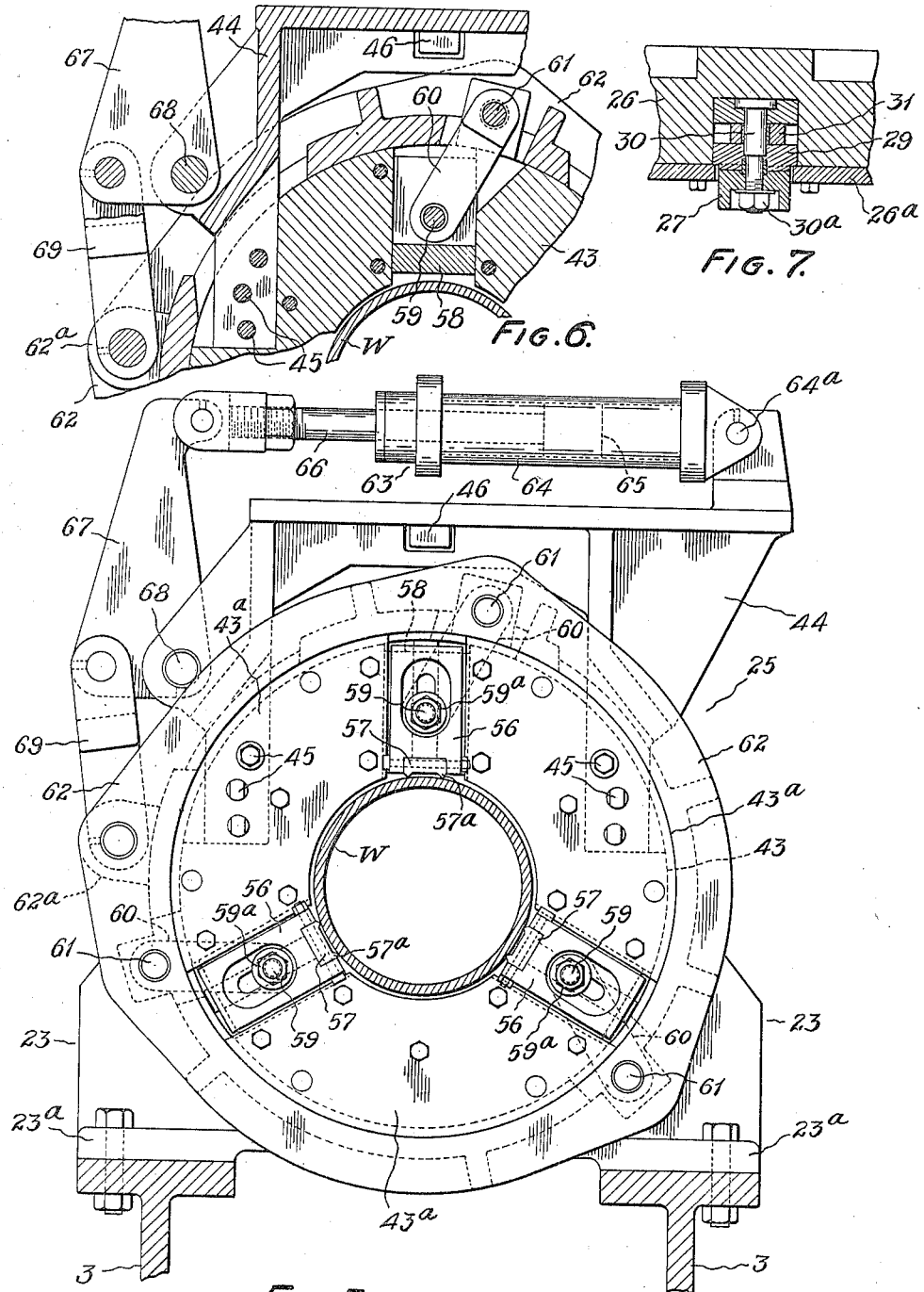

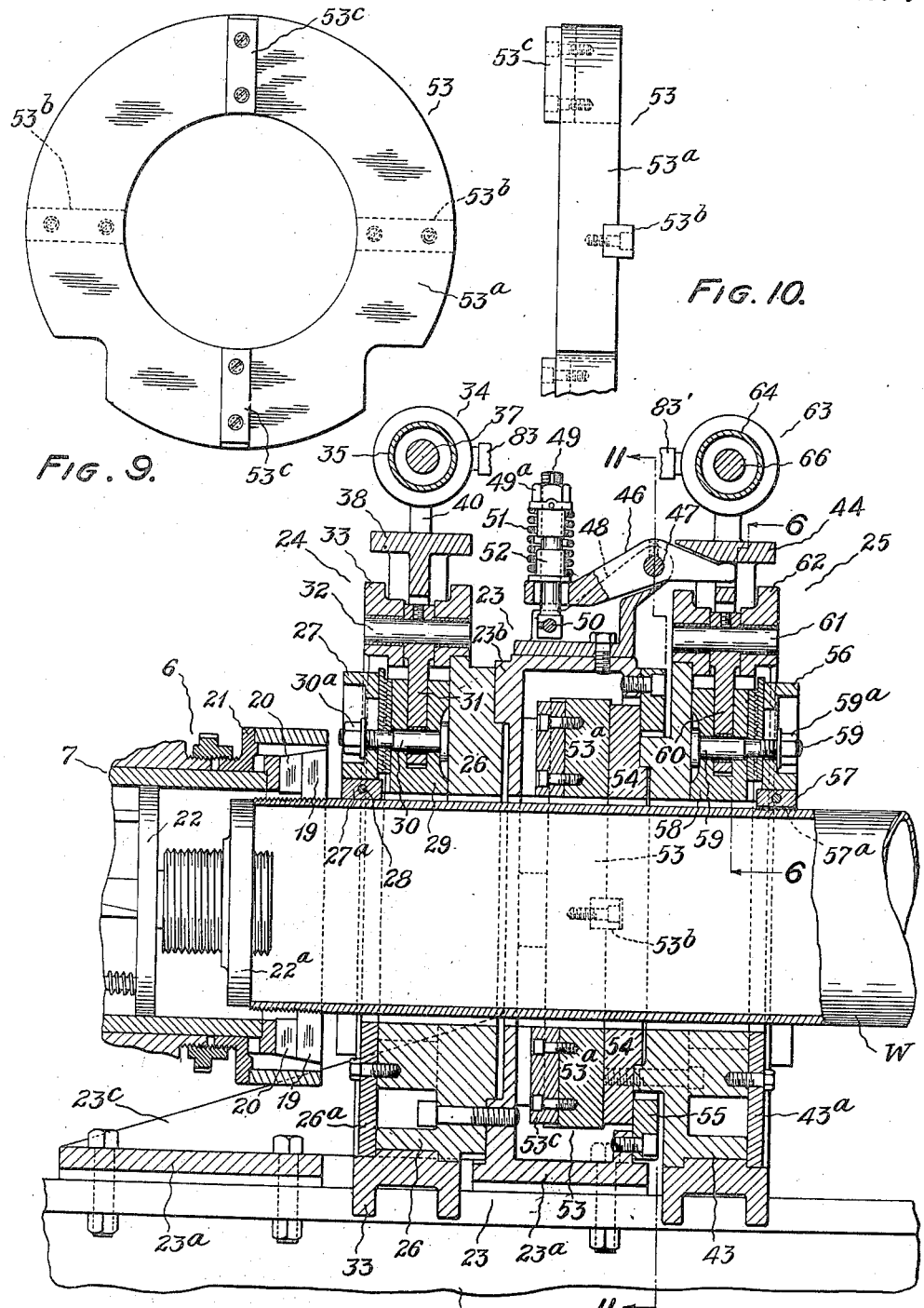

Dec. 19, 1939. W. L. BENNINGHOFF 2,184,136
APPARATUS FOR CUTTING THREADS
Filed Sept. 6, 1938 6 Sheets-Sheet 5

INVENTOR:
W. L. Benninghoff
BY Ray S. Gehr
ATTORNEY

Dec. 19, 1939.      W. L. BENNINGHOFF      2,184,136
APPARATUS FOR CUTTING THREADS
Filed Sept. 6, 1938      6 Sheets-Sheet 6

INVENTOR:
W. L. Benninghoff
BY Ray S. Lehr
ATTORNEY

Patented Dec. 19, 1939

2,184,136

UNITED STATES PATENT OFFICE 2,184,136

APPARATUS FOR CUTTING THREADS

William L. Benninghoff, Shaker Heights, Ohio

Application September 6, 1938, Serial No. 228,547

4 Claims. (Cl. 10—107)

This invention relates to apparatus for forming screw threads on pipes.

Commercial iron or steel pipes are made in lengths up to forty feet or more and are quite commonly made in lengths up to thirty feet. Commercial pipes depart more or less from circular cross-sectional form and from axial straightness and, because of this fact, it is difficult to form screw threads on the ends of pipe sections and insure that they be concentric throughout with the mean axis of the pipe, as defined by a straight line joining the centers of the two ends of the pipe section. The departure of the pipe end from circular form, if it is not too great, can be overcome by a trueing-up machining operation, either in advance of or in conjunction with the thread-forming operation; and it is possible by means of a machine such as is disclosed in my United States Patent No. 2,067,626, granted January 12, 1937, to produce threads of true circular form and to overcome the difficulty above referred to incident to departure from axial straightness.

In the said patented machine two work clamps or chucks are provided to hold the pipe section in fixed position during the thread-forming operation, both clamps being maintained in axial alignment with the thread-forming cutters and one of the clamps being adapted to grip the pipe close to the part to be threaded firmly enough to prevent lateral displacement of the pipe but not strongly enough to pinch the pipe out-of-round, while the second clamp is disposed sufficiently far from the part of the pipe being threaded so that if the force with which it grips the pipe in order to hold the pipe against movement is great enough to pinch the pipe out-of-round this deformation is not transmitted to the end part of the pipe being threaded and the cutting of the threads of true circular form is not interfered with. In the machine disclosed in the said patent the second clamp is placed much further from the first clamp than is necessary to prevent cross-sectional deformation of the end of the pipe being threaded and this wide spacing of the second clamp from the first one has the marked advantage in threading the longer pipe sections that the end of the pipe remote from the threading cutters is readily, and practically automatically, brought into approximate axial alignment with the other end of the pipe and the said cutters. This axial alignment of the pipe results from the fact that, even if the pipe does depart (within commercially permissible limits) from axial straightness and that part of the pipe gripped by the second clamp is somewhat out of alignment with the ends of the pipe section, the point at which the second clamp grips the pipe is so far from the first clamp that any angular departure of the mean axis of the pipe from the cutter axis is minimized and the remote end of the pipe is positioned sufficiently close to the cutter axis.

However, this desirable result is attained at the cost of a large and heavy machine since the machine frame must be long enough to support the widely separated clamps and massive enough to insure adequate strength and stability. Where a large volume of long pipe sections are to be threaded the cost of a machine such as that disclosed in the said Patent No. 2,067,626 is amply justified by the large production capacity of the machine and the high quality of the work produced by it. Where, however, the volume of such work is not so great, a smaller and less costly machine than has heretofore been available for the production of high quality pipe threads is desirable.

An object of the present invention is the production of a threading machine such as that last referred to above as not heretofore available and which is characterized by relative compactness, light weight and low production cost of the machine proper and by its capability, in conjunction with auxiliary pipe-supporting rolls commonly employed with pipe threading machines, of forming highly accurate screw threads on commercial pipe sections.

Another object of the invention is the provision of a machine for threading pipe sections having new and improved clamp or chuck mechanism.

With the above noted and other more or less ancillary objects in view, the present invention consists in certain combinations of parts and features of construction hereinafter set forth in connection with the accompanying drawings showing the preferred embodiment of the invention.

In the drawings,

Figure 3 is a fragmentary plan view of the clamp or chuck mechanism of the apparatus on a larger scale than Fig. 1.

Fig. 4 is an enlarged section on the line 4—4 of Fig. 2.

Fig. 5 is an enlarged section on the line 5—5 of Fig. 2.

Fig. 6 is a fragmentary section on the broken line 6—6 of Fig. 8.

Fig. 7 is a fragmentary section on the line 7—7 of Fig. 4.

Fig. 8 is an enlarged fragmentary vertical section on the line 8—8 of Fig. 1.

Figs. 9 and 10 are enlarged face and edge views, respectively, of one of the main parts of the floating clamp or clutch mechanism.

Figures 1, 2:
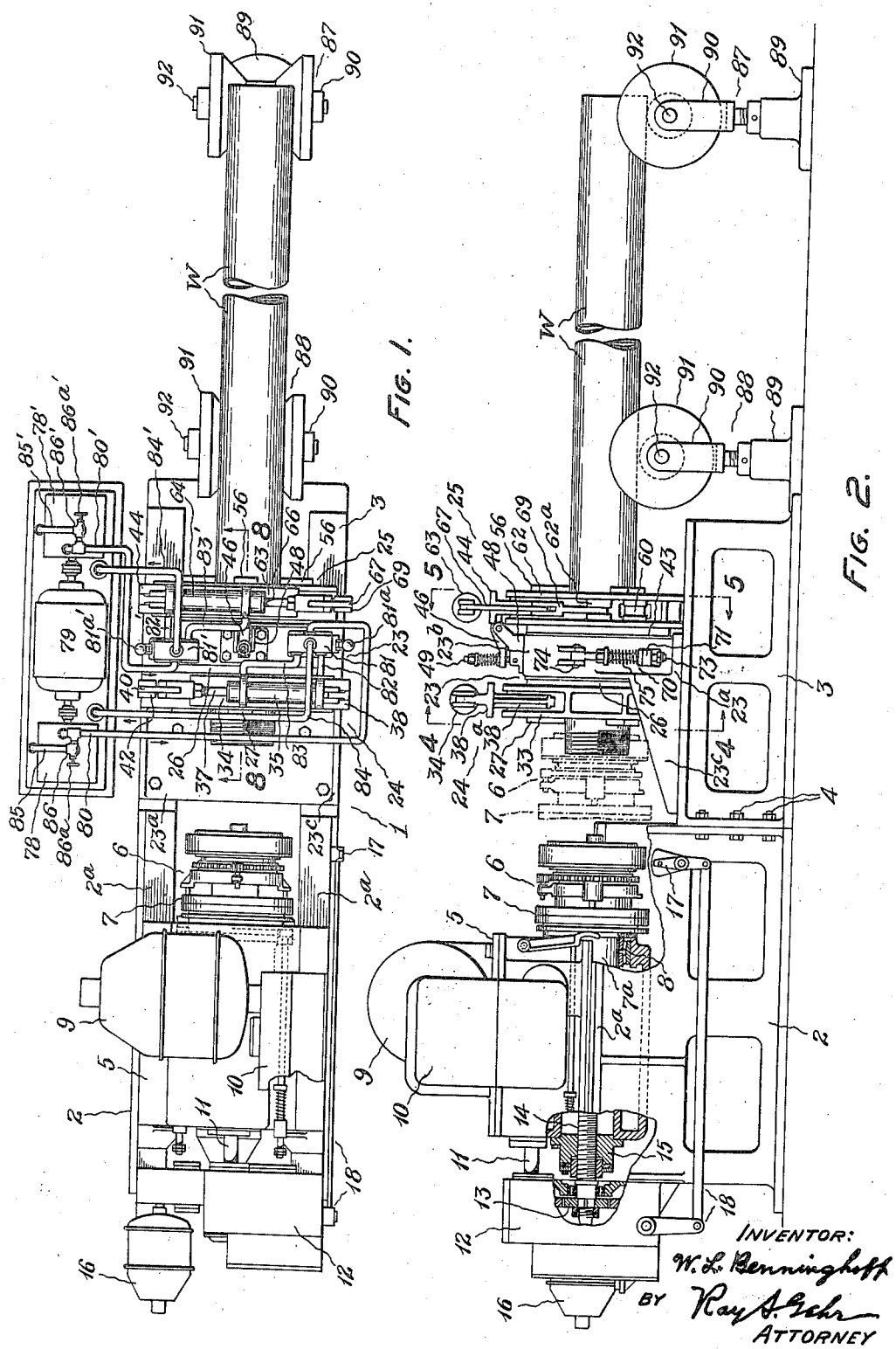
Fig. 1 is a plan view of a pipe threading apparatus embodying the invention.
Fig. 2 is a front elevation of the apparatus shown in Fig. 1 with the hydraulic conduits and valves of the clamp omitted.
Figure 12:
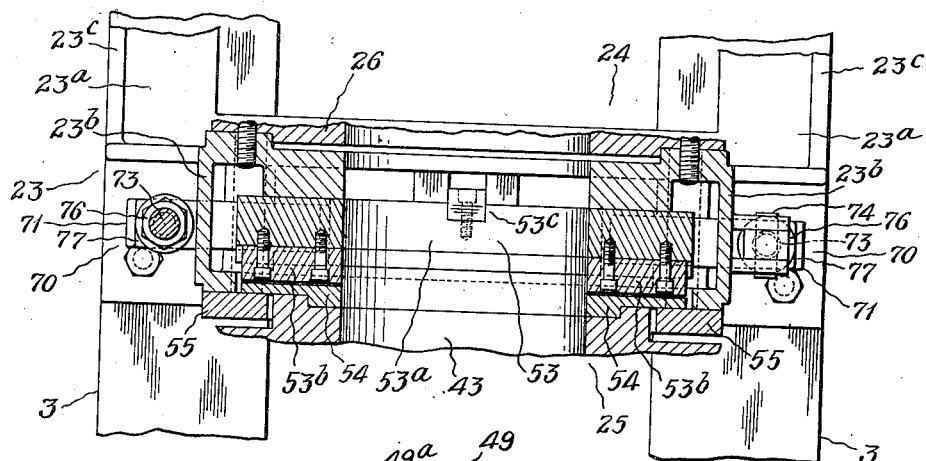
Fig. 12 is a section on the broken line 12—12 of Fig. 11, the pipe being omitted.

In prior pipe threading machines, in some cases the pipe section to be threaded has been rotated while the non-rotatable thread cutters have been advanced axially in relation to the pipe, in other cases the pipe section to be threaded has been held against rotation but advanced axially in relation to the thread cutters mounted to rotate about the axis of the thread to be formed, and in still other cases the pipe to be threaded has been held in fixed position while the rotating thread cutters have been advanced axially in relation to the pipe. See for examples Figs. 1 and 20 of my United States Patent No. 2,054,028 and my above mentioned Patent No. 2,067,626. In carrying out my present invention since the apparatus is intended to be adapted to form threads on pipe sections of considerable length I prefer to hold the pipe section against rotational movement and, while it is feasible to advance the pipe axially in relation to rotatably mounted thread cutters, I prefer also to hold the pipe against endwise movement and advance the rotating thread cutters axially relative to the pipe. In the construction illustrated in the accompanying drawings I have followed this preferred practice.

Referring in detail to the construction illustrated and first to the thread-forming mechanism and the means for rotating the cutters and advancing them axially, I observe that this portion of my improved apparatus is substantially identical with the corresponding parts of the pipe-threading machine shown in my Patent No. 2,067,626. The machine is provided with a bed frame designated in its entirety by the numeral 1 and comprising a section 2 upon which the thread-cutting tool and the driving mechanism therefor are mounted and a section 3 upon which the pipe-supporting means are mounted, the two sections 2 and 3 being preferably rigidly secured together as by bolts 4. The frame section 2 is provided with ways 2a, 2a upon which is slidably mounted a carriage 5. In one end of this carriage is rotatably mounted a threading die designated as an entirety by 6, said threading die having a body 7 formed with a trunnion part 7a which is rotatably mounted in bearings in the carriage 5, one of said bearings being shown at 8. A motor 9 mounted on the top of the carriage 5 serves to rotate the die 6 through the medium of a suitable train of gears, not shown, within the gear box 10 and the frame or casing of the carriage. The train of gears referred to has a suitable spline connection with a shaft 11 which is mounted in a gear box 12 bolted to the end of the frame section 2. The shaft 11 through a train of gears 13 enclosed in the gear box 12 rotates a feed screw 14 which operatively engages a nut 15 fixedly secured to the carriage 5 so that the rotation of the feed screw 14 is adapted to feed the carriage 5 forward (to the right in Fig. 2) or to retract it, according to the direction of rotation of the screw. Consequently the motor 9 is adapted to rotate the threading tool 6 and simultaneously feed said tool axially forward to the work.

To effect a rapid retraction of the carriage 5 I provide a separate motor 16 which is connected by suitable gears with the train of gears 13 in a manner to rotate the feed screw 14 at a higher speed than is feasible with the gear connection between the motor 9 and said feed screw. The hand lever 17 (a part of which is broken away in Fig. 2) is connected by suitable link and lever devices designated as an entirety by 18 with a clutch mechanism (not shown) adapted to operatively connect the train of gears between the motor 16 and the feed screw 14 and to disconnect the train of gears between the motor 9 and said feed screw or vice versa.

The detailed forms of construction of the mechanism for rotating and axially feeding the thread-forming tool 6 can be varied widely in carrying out my invention and I have, therefore, deemed it unnecessary to illustrate and describe such parts of the mechanism in full detail.

Similarly, in carrying out my invention the thread-forming tool itself may take a wide variety of known forms of such tools and it is unnecessary, therefore, to describe it in detail. As illustrated, the tool 6 is of the same character as the threading die disclosed in my above mentioned Patent No. 2,054,028, to which reference may be had for a complete detail disclosure. For the purpose of disclosing the present invention it will suffice to state that the tool comprises a series of cutters or chasers 19 (Fig. 8) slidably mounted on the front end of the tool body 7 so as to be gradually retracted outward in relation to the pipe during the cutting operation in order to form the usual taper thread. To effect such retraction of the chasers they are operatively connected by cam devices 20 with a structure 21 slidably mounted on the outside of the tubular body 7 and this slide 21 is in turn connected by suitable cam devices (not shown) with a structure 22 slidably mounted inside the tool body 7. The inner slide 22 carries an adjustable plate 22a adapted to engage the end of the pipe to be threaded so that when the tool body 7 is fed axially forward in relation to the pipe the inner slide 22 is moved longitudinally of the tool body and, by its cam connection with the outer slide 21, effects a similar longitudinal movement of the latter on the tool body and in relation to the chasers 19 so that the latter, by reason of their cam connection 20 with the slide 21 are gradually retracted in the manner referred to. The tool 6 may be provided with mechanism, such as is disclosed in detail in my Patent No. 2,054,028 above referred to, for effecting a rapid retraction of the chasers out of engagement with the pipe at the end of the thread-forming operation and the tool may be provided with suitable means for re-setting the chasers when the carriage and the tool 6 have been returned to their starting position preparatory to starting another thread-cutting operation. The chasers 19 are mounted at the extreme end of the cutting tool in such a manner that they can approach close to a work support.

On the frame section 3 is mounted the multiple clamp or clutch mechanism of the machine. This mechanism comprises a frame structure 23 rigidly bolted to the frame section 3. Frame 23 comprises a base portion 23a, a cored-out upstanding part 23b and strengthening flanges 23c extending between the parts 23a and 23b. On the frame 23 is mounted a front clamp or chuck, which is designated as an entirety by 24, and a rear clamp or chuck, which is designated as an entirety by 25. Referring first to the front clamp, as illustrated in Figs. 4 and 8, the device comprises a body part 26 which is rigidly bolted, as shown in Fig. 8, to the frame 23. Mounted for radial movement in relation to the body 26 are three pipe gripping blocks 27 fitted with removable inserts 27a of hardened steel or the like which are secured to blocks 27 by bolts 28. The gripping blocks 27 are adjustably mounted on slides 29 which engage radial ways formed in body 26. To provide for the adjustable mounting of gripping blocks 27, the latter are slotted to receive a clamping bolt and nut 30, 30a. The mutually engaging faces of blocks 27 and slides 29 are toothed to strengthen the adjustable connection. The gripping blocks and their supporting slides are actuated by links 31 which are connected at their inner ends to clamping bolts 30 which thus serve also as wrist pins, and at their outer ends to wrist pins 32 carried by an actuating ring 33 which is mounted to slide circumferentially on body 26. Face plates 26a which are bolted to the front side of body 26 serve to secure both the actuating ring 33 and the slides 29.

The actuating ring 33 is moved by a hydraulic motor 34 which comprises a cylinder 35, a double-acting piston 36 and piston rod 37. At one end the cylinder 35 is pivotally supported on a bracket 38 which has depending legs 38a secured by bolts 39 to the clamp body 26 (Fig. 4). At its other end the hydraulic motor is supported by a lever 40 which is pivotally connected at its upper end to the piston rod 37 and is supported on a pivot pin 41 carried by bracket 38. Lever 40 is operatively connected by link 42 to a lug 33a on the actuating ring 33. Thus movement of the piston will actuate lever 40 to move the actuating ring 33 in one direction or the other around the clamp body 26 to move the gripping blocks 27 radially inward or outward. With the blocks 27 symmetrically adjusted in relation to the machine axis, the action of said gripping blocks is to support the end of the pipe to be threaded coaxially with the thread cutters.

The rear clamp or chuck comprises a body member 43 which is supported from the frame 23 but not rigidly or fixedly as in the case of the body 26 of the front clamp. Instead, the body 43 is supported so as to float in relation to the frame 23, that is to say, so as to have a limited movement in any non-rotational direction at right angles to the axis of the machine. This floating support is provided in the following manner. A motor-supporting bracket 44 is rigidly secured by bolts 45 to the body 43 in substantially the same manner as the bracket 38 is secured to the body 26 of the front clamp. The bracket 44 is apertured, as shown in Fig. 8, to accommodate one end of a supporting lever 46, the aperture being considerably wider than the lever so as to provide for their relative lateral movement. Lever 46 is mounted on a pivot pin 47 carried by bracket 48 which is rigidly bolted to the top of the frame 23. The front end of lever 46 is apertured to receive an abutment rod 49, the lower end of which is pivotally secured by a pin 50 to the bracket 48. Upward movement of the forward end of lever 46 in relation to the rod 49 is resisted by a heavy coiled spring 51. The lower end of spring 51 engages a flanged sleeve 52 slidably mounted on the rod 49 and engaging the upper side of lever 46, while the upper end of spring 51 engages a flanged nut 49a adjustably mounted on rod 49. The spring 51 thus serves to yieldingly counterbalance the weight of the rear clamp body 43 and some at least of the parts which are carried thereby.

The body 43 of the rear clamp is held against rotational movement around the axis of the machine by a coupling 53 between body 43 and the frame 23. The coupling 53 (Figs. 8, 9 and 10) comprises a ring 53a which is fitted on its rear side with horizontally disposed splines 53b, 53b which slidably engage horizontal slots in a ring 54 which is rigidly bolted to the body 43. On its front face the ring 53a is fitted with vertical splines 53c which slidably engage slots formed in the upstanding part 23b of frame 23. A ring 55 rigidly bolted to frame 23 engages the rear side of the peripheral part of ring 54 and thus holds the assembly comprising body 43 and the coupling 53 against axial movement in relation to frame 23. At the same time the body 43 is permitted to have limited radial movement in any direction while it is held also against rotational movement.

As in the case of the front clamp, the rear clamp has its body member 43 fitted with gripping blocks 56 having insert members 57 of hardened steel with pipe-engaging teeth 57a, and with radially mounted slides 58 on which the gripping blocks are adjustably mounted by clamping bolts and nuts 59, 59a. The slides 58 are actuated by links 60 which are connected at their inner ends to the bolts 59 and at their outer ends to wrist pins 61 carried by an actuating ring 62 mounted to slide circumferentially on the periphery of the clamp body 43, said body being fitted with segmental face plates 43a which serve to movably secure the actuating ring 62 and the slides 58 on the body 43.

The bracket 44 supports a hydraulic actuating motor 63 for the rear clamp. This motor is similar to that of the front clamp and comprises a cylinder 64, piston 65 and piston rod 66. One end of the cylinder is pivotally supported at 64a on the bracket 44 and the other end of the motor is supported by a lever 67 which has its upper end pivotally connected to the piston rod and is mounted on a pivot pin 68 carried by bracket 44. The lever 67 is connected by a link 69 to a lug 62a on actuating ring 62. Movement of the piston of the motor 63 effects circumferential motion of the actuating ring 62 and corresponding radial movement of the gripping blocks 56 in the same manner as the front clamp is actuated by its hydraulic motor 34.

Figure 11:
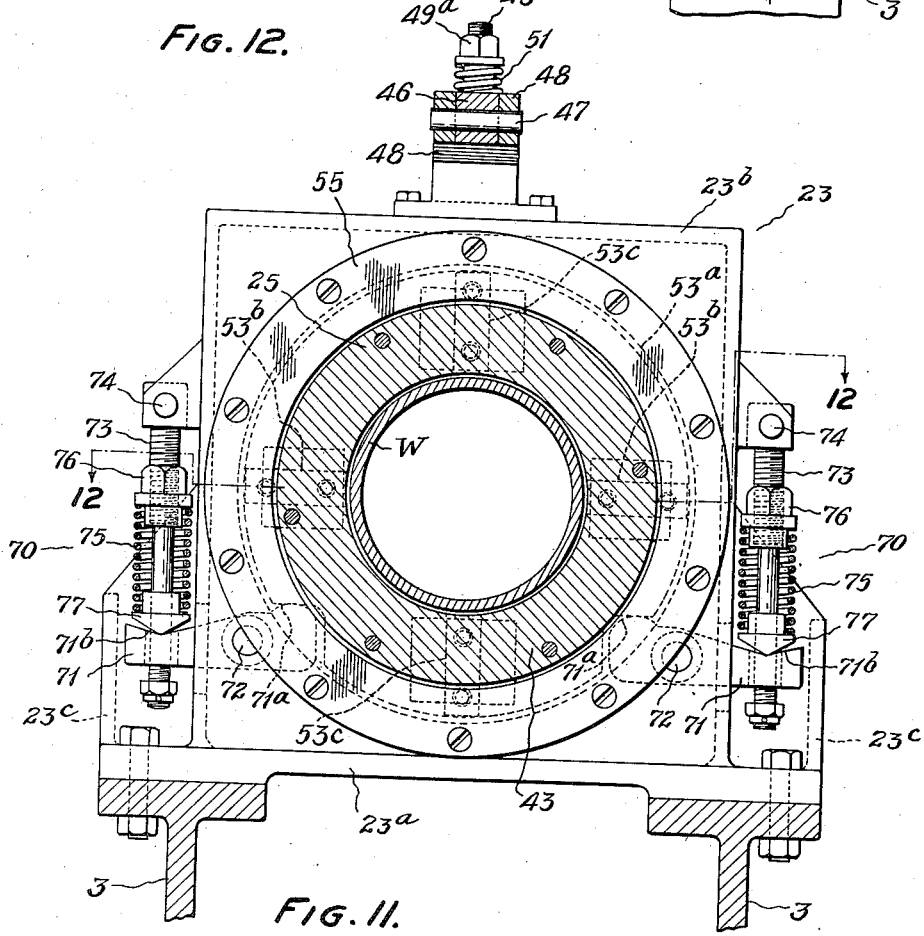
Fig. 11 is a section on the broken line 11—11 of Fig. 8.

From an inspection of Fig. 8 it will be observed that the mass of the relatively heavy parts constituting the coupling 53 is offset forward in relation to the floating support afforded the rear clamp by the rear end of lever 46. To avoid such an overhanging load and the resultant interference with the free floating movement of the rear clamp I provide additional yielding supports 70, 70 for the mass of the coupling 53 (Fig. 11). One such support is provided at the front side of the coupling and the other at the rear side thereof. The parts of these supports are substantially identical and the following description will apply to both. 71 is a lever mounted on pivot pin 72 carried by the frame 23. The inner end of the lever 71 has an upper rounded surface 71a to engage a shoulder formed on the floating ring 53a. The outer end of lever 71 is apertured to receive a depending rod 73, the upper end of which is pivotally connected at 74 to the frame 23. Surrounding the pin 73 is a heavy coiled spring 75, the upper end of which bears against an abutment provided by nut 76 adjustably engaging pin 73. The lower end of the spring 75 bears against a flanged sleeve 77 which is formed with knife edges to engage saddle surfaces 71b on the upper side of lever 71. The supports 70, 70 and the top support afforded by lever 46, together afford yielding three-point support for the weight of the rear clamp 25 and coupling 53 and the three points of support are so disposed that the said clamp 25 is relatively free for limited, non-rotational movement in any direction perpendicular to the machine axis without binding or undue friction.

The hydraulic motors 34 and 63 which actuate the pipe clamps are energized by pumps 78, 78' driven by motor 79 (Fig. 1). Referring first to the pump 78 and its associated devices, the discharge from said pump is taken through a pipe 80 to a valve device 81 which is controlled by a manual lever 81a. The casing of the valve device 81 is connected with one end of cylinder 35 by a pipe 82 and with the other end of said cylinder by a pipe 83 and a return pipe 84 leads from the valve casing back to the sump of the pump. By manual operation of valve 81 liquid under pressure can be admitted to one end of the cylinder of the hydraulic motor 34 to close the front clamp or to the other end of the said cylinder to open the clamp. Thus, when the clamp is to be closed the valve is set to conduct liquid through pipes 80 and 82 to the motor cylinder while liquid discharged from the motor cylinder is conducted through pipe 83 to the casing of valve 81 and thence through the return line 84 to the sump of the pump; and, similarly, when the front chuck is to be opened the valve is moved to conduct fluid under pressure from the valve through pipe 83 into the other end of the motor cylinder while liquid from the first end of the cylinder is discharged through pipe 82 through the valve and pipe 84 to the pump sump.

The pump 78 is fitted with means by which the operator can regulate at will the maximum discharge pressure from the pump. This means comprises a pipe 85 which leads from the discharge pipe 80 to the sump or supply reservoir of the pump. This pipe 85 is controlled by a spring-pressed check valve 86 which opens when the pressure in the pipe 80 rises to a predetermined value to permit escape of liquid through the pipe 85. The relief valve 86 is provided with manual means 86a by which the tension of the valve spring can be adjusted to vary the pressure at which the valve opens. The detail construction of the valve is not shown since such valves are well known. With this pressure-regulating means the maximum force with which the gripping blocks 27 are pressed against a pipe, as shown in Fig. 4, can be limited to any desired value by suitable manual adjustment of the spring of the valve 86.

The other motor cylinder 63 is operatively connected with pump 78' by means of discharge pipe 80', valve 81', pipes 82' and 83' and return pipe 84' corresponding to the several pipes and the valve associated with the motor cylinder 34. Also the pump 78' is fitted with a discharge pressure-regulating means as in the case of pump 78, said means comprising branch pipe 85', spring-pressed valve 86' with manual regulator 86a'.

In the operation of the clamps the regulator valve 86 is set or adjusted so that the maximum discharge pressure is sufficiently low to prevent the front clamp of the machine from exerting a sufficiently high pressure to distort the end part of the pipe upon which the thread cutters operate. On the other hand, the regulator valve 86' is adjusted so that the pressure of the rear clamp upon the pipe will be sufficiently great to effectively hold the pipe from turning about its axis during the threading operation. The maximum pressure with which the rear clamp engages the pipe may for this purpose be made much higher, if necessary, than the pressure exerted by the front clamp since the rear clamp is spaced sufficiently far from the cutters to insure that any cross sectional distortion of the pipe by the rear clamp is not measurably transmitted to the end part of the pipe which the thread cutters engage.

In the use of my improved machine, since both clamps or chucks are disposed relatively near the end of the pipe being threaded it is necessary to provide suitable support for the rear end of the pipe and for this purpose I employ one or more flanged rollers such as those shown in Figs. 1 and 2 of the drawings at 87 and 88. These supporting roller devices are alike and each comprises a base 89 upon which is adjustably mounted a forked standard 90 between the arms of which the roller 91 is supported by shaft 92. The number of such roller supports will naturally depend upon the length of the pipe to be threaded. In any event it is desirable to provide, in addition to the support for the rear end of the pipe, at least a second support of this character arranged, as shown in Figs. 1 and 2, closely adjacent the rear end of the machine frame to facilitate the introduction of the pipe through the clamps of the machine. Furthermore, if desired, one or more of the roller supports employed may be of the well known motor-driven type to facilitate the introduction of the pipe into the machine and its removal therefrom.

The operation of my improved apparatus and the manner in which it is used in the threading of pipes will now readily be understood. Preparatory to its use, the gripping blocks of both the front and the rear clamps are adjusted on their slides to conform to the diameter of the pipe to be threaded. In the drawings I have indicated the threading of a long pipe section W of relatively large diameter. The length of the pipe sections to be threaded being known, the roller support 87 is positioned so as to support the rear end of the pipe section, the roller being lined up, by any suitable known procedure, with the axis of the thread cutters. The roller support 88 is preferably adjusted to a level slightly lower than support 87. A pipe section is then lowered into position on the roll supports 87 and 88 and pushed forward endwise through the two clamps to a suitable position to be engaged by the cutters. Then, the pressure regulator valves 86, 86' having been suitably adjusted in the manner and for the purpose previously described, the operator actuates valve 81 of the front clamp to close the latter thereby accurately positioning the front end of the pipe in axial alignment with the cutters.

Next, the operator actuates valve 81' to close the rear clamp or chuck and firmly grip the pipe so as to hold it against rotation during the threading operation.

If the pipe section being threaded is crooked, as practically all commercial pipe is in some degree, the rear clamp as it engages the pipe will adjust itself by lateral movement at right angles to the axis of the machine so as to conform with the axial position of that section of the pipe gripped by the clamp. This floating action of the rear clamp permits a strong and effective gripping of the pipe without any substantial tendency to move either the front end or the rear end of the pipe section. This, of course, is particularly important with respect to the rear end of the pipe section since the adjustable roller support employed at that point is not adapted, as is the front clamp of the machine, to firmly hold the pipe in line.

Figure 14:
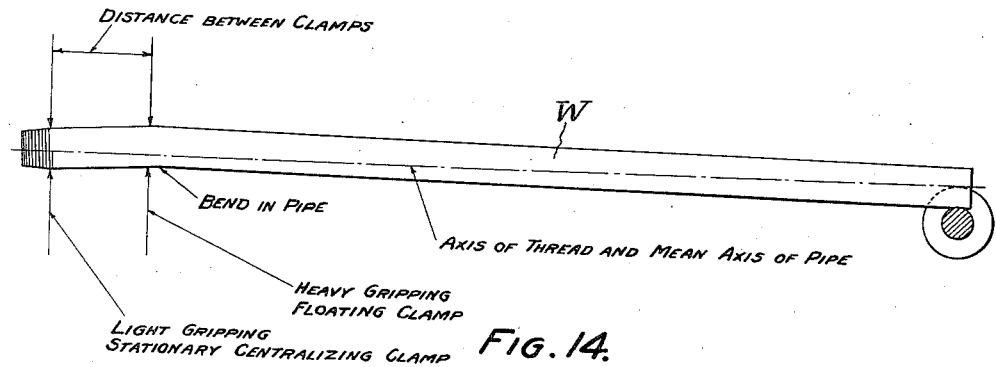
Fig. 14 is a reduced scale diagrammatic view of a crooked pipe section to explain the principle upon which my improved apparatus operates.
Figure 13:
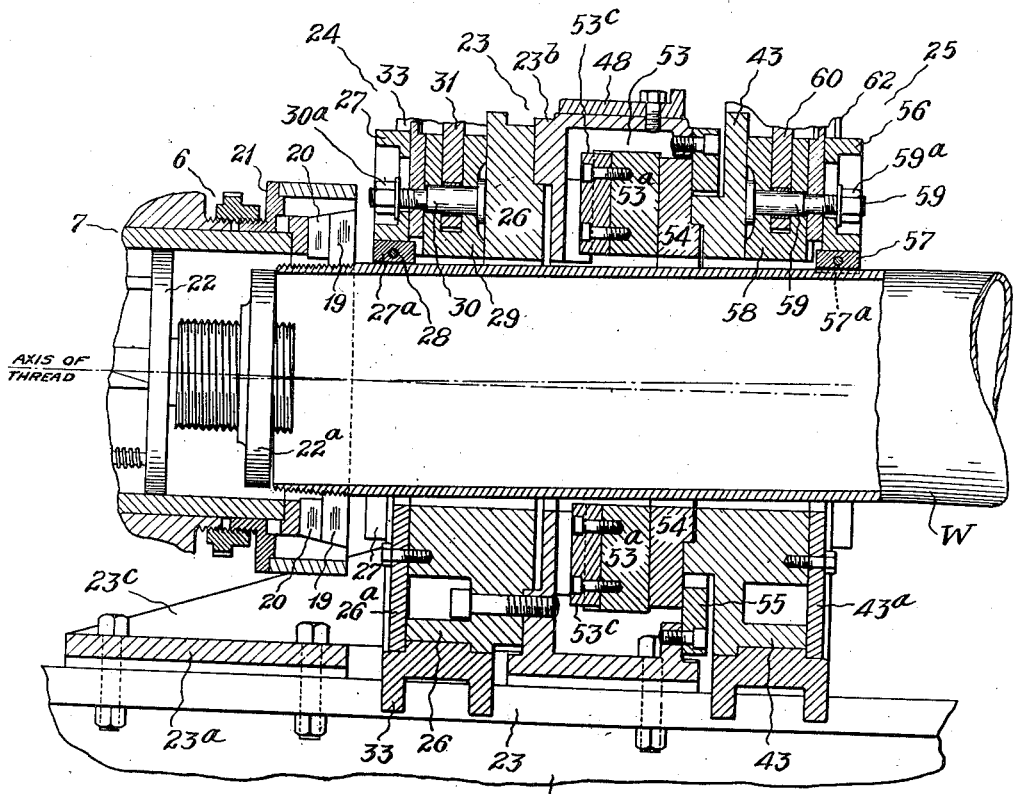
Fig. 13 is an enlarged fragmentary section corresponding to Fig. 8 illustrating the manner in which the floating chuck accommodates itself to the irregularity of a crooked pipe section.

It not infrequently happens that commercial pipe sections may have bends relatively near their ends and in Figs. 13 and 14 I have illustrated the manner in which my improved chuck mechanism is adapted to hold such a pipe section. From Fig. 13 it will be observed that the front clamp has its gripping blocks in engagement with the pipe relatively close to the part thereof engaged by the cutters. The front clamp is thus adapted to hold the front end of the pipe substantially in axial alignment with the cutters because its gripping blocks are definitely positioned in relation to its body part 26 which is rigidly held in axial alignment with the cutters. In the case of the rear clamp, on the other hand, the gripping blocks are permitted to adjust themselves upward to accommodate the adjacent upward bend of the pipe section because of the adjustable floating support provided for the body 43 of the rear clamp.

As will be seen from an inspection of Fig. 13, while the downward inclination of the front end of the pipe results in some variation in the thickness of the threaded portion of the pipe, this variation is minimized by aligning the mean axis of the pipe, indicated in Fig. 14, with the axis of the cutters. Furthermore, the force of the front clamp (though sufficient to prevent lateral displacement of the pipe in any radial direction) is insufficient to distort the pipe and hence the thread formed on the pipe has a true, fully circular cross sectional form.

With the pipe section firmly clamped in position and with the threading tool 6 in retracted position as shown in full lines in Figs. 1 and 2, the motor 9 is started to rotate the threading tool 6 and simultaneously feed it forward to the work or, if preferred, the higher speed feed driven by the motor 16 can be employed initially to feed the tool 6 forward until it is close to the work and then the motor 16 can be thrown out and the motor 9 started. The operation of the tool 6 in cutting the thread need not be described in detail as it specifically constitutes no part of the present invention. When the tool has reached the end of the thread-cutting operation the tool, as indicated by dot-and-dash lines in Fig. 2, if it be of the type illustrated, will automatically retract the chasers, whereupon the motor 9 is thrown out of operation and the motor 16 is started to retract the tool and permit the pipe to be released from the clamps and removed preparatory to the insertion of another pipe section or to the reversal of the same pipe section for the threading of its other end. To release the pipe from the clamps, the control valves 81, 81' are suitably actuated to effect the opening movement of the clamps.

My improved threading machine obviously is adapted for the threading of pipe sections varying widely both in diameter and in length. Furthermore the machine, while adapted to cut screw threads of true form in close alignment with the mean axis of the pipe, is, as to the machine proper, relatively small and of correspondingly low production cost.

While I have illustrated and described a preferred form of construction embodying my improvements, it should be understood that equivalent features of construction and arrangement are within the invention as defined in the appended claims.

What I claim is:

1. In pipe threading apparatus in which a thread-cutting tool movably mounted on a frame is rotated around the axis of the thread to be formed on the work and in which simultaneously relative axial movement of the tool and work is effected, the combination with a frame, of means thereon for supporting one end of a section of pipe to be threaded in axial alignment with the tool while the latter operatively engages it, said means comprising a clamp adapted, without substantial distortion of the cross-sectional form of the pipe, to grip the pipe sufficiently close to the part thereof to be threaded to hold said part of the pipe against movement transversely of its axis, a second pipe clamp for holding the pipe against turning arranged to grip the pipe at points sufficiently remote from the part thereof to be threaded so that local distortion of the cross sectional form of the pipe by said clamp will not affect the form of the thread cut on the pipe, and means carried by the frame affording the second clamp a floating support adapted to permit limited non-rotational movement of the clamp in any direction substantially perpendicular to the axis of the thread formed on the pipe, whereby the remote end of the pipe also may be supported in axial alignment with the tool and the latter form a thread on the pipe of substantially true circular form and substantially concentric with the mean axis of the pipe section notwithstanding crookedness of said pipe section.

2. Pipe-threading apparatus as claimed in claim 1 in which the second pipe clamp is constructed and arranged to grip the pipe at points substantially as close to the first clamp as is possible without having local distortion of the cross-sectional form of the pipe by the second clamp affect the form of the thread cut on the pipe, whereby the length of the frame of the apparatus is minimized.

3. In pipe threading apparatus in which a thread-cutting tool movably mounted on a frame is rotated around the axis of the thread to be formed on the work and in which simultaneously relative axial movement of the tool and work is effected, the combination with a frame, of means thereon for supporting one end of a section of pipe to be threaded in axial alignment with the tool while the latter operatively engages it, said means comprising a clamp adapted, without substantial distortion of the cross-sectional form of the pipe, to grip the pipe sufficiently close to the part thereof to be threaded to hold said part of the pipe against movement transversely of its axis, a second pipe clamp for holding the pipe against turning arranged to grip the pipe at points sufficiently remote from the part thereof to be threaded so that local distortion of the cross sectional form of the pipe by said clamp will not affect the form of the thread cut on the pipe, means carried by the frame affording the second clamp a floating support adapted to permit limited non-rotational movement of the clamp in any direction substantially perpendicular to the axis of the thread, and means, comprising a part adjustably supported independently of the said frame, for supporting the end of the pipe remote from the cutters in axial alignment with the latter, whereby a thread is formed on the pipe with substantially true circular form and substantially concentric with the mean axis of the pipe section notwithstanding crookedness of said pipe section.

4. In pipe threading apparatus in which a thread-cutting tool movably mounted on a frame is rotated around the axis of the thread to be formed on the work and in which simultaneously relative axial movement of the tool and work is effected, the combination with a frame, of means thereon for supporting one end of a section of pipe to be threaded in axial alignment with the tool while the latter operatively engages it, said means comprising a clamp adapted, without substantial distortion of the cross-sectional form of the pipe, to grip the pipe sufficiently close to the part thereof to be threaded to hold said part of the pipe against movement transversely of its axis, a second pipe clamp for holding the pipe against turning arranged to grip the pipe at points substantially as close to the first clamp as is possible without having local distortion of the cross sectional form of the pipe by the second clamp affect the form of the thread cut on the pipe, means carried by the frame affording the second clamp a floating support adapted to permit limited non-rotational movement of the clamp in any direction substantially perpendicular to the axis of the thread formed on the pipe, and means, comprising a part adjustably supported independently of the said frame, for supporting the end of the pipe remote from the cutters in axial alignment with the latter, whereby a thread is formed on the pipe with substantially true circular form and substantially concentric with the mean axis of the pipe section notwithstanding crookedness of said pipe section.

WILLIAM L. BENNINGHOFF.